(12) United States Patent
Ricagni

(10) Patent No.: US 7,721,296 B2
(45) Date of Patent: May 18, 2010

(54) EVENT BASED CHARGING IN A COMMUNICATIONS SYSTEM

(75) Inventor: Giuseppe Ricagni, Cornaredo (IT)

(73) Assignee: Ericsson AB, Stockholm (SE)

( * ) Notice: Subject to any disclaimer, the term of this patent is extended or adjusted under 35 U.S.C. 154(b) by 1745 days.

(21) Appl. No.: 10/461,855

(22) Filed: Jun. 13, 2003

(65) Prior Publication Data

US 2004/0255025 A1    Dec. 16, 2004

(51) Int. Cl.
*G06F 13/00* (2006.01)
(52) U.S. Cl. ........................ 719/318; 719/313
(58) Field of Classification Search ................ 719/318, 719/313; 705/52
See application file for complete search history.

(56) References Cited

U.S. PATENT DOCUMENTS

| | | | |
|---|---|---|---|
| 6,047,051 A * | 4/2000 | Ginzboorg et al. | 379/130 |
| 6,173,407 B1 * | 1/2001 | Yoon et al. | 726/9 |
| 6,240,091 B1 * | 5/2001 | Ginzboorg et al. | 370/401 |
| 7,187,681 B1 * | 3/2007 | O'Toole et al. | 370/401 |
| 7,369,841 B1 * | 5/2008 | Uhlik et al. | 455/406 |
| 7,426,730 B2 * | 9/2008 | Mathews et al. | 718/104 |
| 2002/0116488 A1 * | 8/2002 | Subramanian et al. | 709/224 |
| 2002/0181447 A1 * | 12/2002 | Hashizume et al. | 370/352 |
| 2004/0107123 A1 * | 6/2004 | Haffner et al. | 705/7 |

* cited by examiner

*Primary Examiner*—Andy Ho
(74) *Attorney, Agent, or Firm*—Trop Pruner & Hu, P.C.

(57) ABSTRACT

A communications system in which event based charging is implemented and in which service flows between end user equipments and application servers are filtered for charging purposes by a traffic plane function (TPF). The TPF identifies a service flow between an end user equipment and an application server and implements event based charging by sending a message to an Event Owner for the service flow requesting notification of Events associated with the service flow. The Event Owner sends a message containing an Event Result to the TPF when an Event associated with the service flow occurs and the TPF correlates the Event Result with the service flow. This correlation may include the matching of the Event Result to the service flow which the TPF then notifies to a billing control function so that the billing control function can bill the end user appropriately based on the Events. This correlation may also include the matching of the Event Result to a data download detected by the TPF on the service flow so that the system operator can confirm that the service flows filtered by the TPF match the Events notified to the TPF by the Event Owner.

39 Claims, 4 Drawing Sheets

100
EVENT BASED CHARGING IN A COMMUNICATIONS SYSTEM

FIELD OF THE INVENTION

This invention relates to charging in a communications system based on events occurring at application servers accessed via the communications system.

BACKGROUND OF THE INVENTION

End users of an Internet Protocol (IP) network, such as a private or public internet or intranet may communicate with the IP network via an access network. The end user uses an end user equipment such as a mobile or stationary telephone or computing device connected to the access network in order to send and receive communications over the IP network. The IP network may be made up of several sub-networks interfaced with each other.

The access network may be a packet switched network, such as a General Packet Radio Service (GPRS) network as defined by the Third Generation Partnership Project (3GPP). The IP network and the access network are generally interfaced by a gateway node of the access network, which is an example of a traffic plane function (TPF). Where the access network is a GPRS network the gateway node will typically be a Gateway GPRS Support Node (GGSN). The gateway node transports data packets between the access network and the IP network. For charging purposes the gateway node, or a network entity associated with the gateway node, identifies packet streams or service flows between an end user connected to the access network and the IP network. Each packet stream or service flow is a flow of data transported between the access network and the IP network via the gateway node and associated with a particular application, service or group of applications and services, such as browsing on a particular site of the IP network or a VoIP (Voice over IP) or multimedia call carried over the IP network.

Content based billing (CBB) may be used for charging the end user for their use of the communications system. In content based billing, the traffic plane function (TPF) (eg. the GGSN or other equivalent device) filters the service flows it transports by matching the service flows to given criteria and measuring the network resource used by a service flow and/or detecting application-level events so that appropriate tariffs can be applied to the service flows based on the matching of the criteria. For example, network resource may be measured by each filter having an associated bucket in which the number of bytes transported over the service flow associated with that filter is stored. A service flow as identified by a gateway may correspond to one or more user data flows.

In the case of online charging, where an end user has paid up front for access to the communications system the TPF is granted a token for an identified service flow. The token is granted by a Service Control Point (SCP) or Online Charging System (OCS), more generically referred to herein as a billing control function and an example of a billing system. Then the TPF measures the network resource consumed by the service flow and/or detects application-level events and decrements the associated token accordingly. In the case of offline charging, where an end user pays later for access to the communication system, the TPF measures the network resource used by service flows and/or detects application-level events and stores the results in a charging log based on instructions from a billing system and/or on gateway local policy. The charging log is sent periodically to the billing system which uses the information to bill the end user.

So far in content based billing the TPF is less aware of the status of the application servers to which a service flow relates than is desirable. Accordingly, the TPF can measure the network resource used by a service flow based only on a limited number of criteria.

In addition, there are service delivery and charging models which the operator of the communications system (referred to herein as the network operator, generally a business organization) may not want to implement for certain application servers which are operated by a business organization different from the network operator and so are not fully trusted by the network operator. For example, the network operator may be requested to charge the end user based on information reported by a third party delivering the service. A level of control and/or monitoring by the network operator of the information reported by the third party is required, beyond that which is currently available, in order for the network operator to verify the reliability of the information reported to it by the third party. In addition the network operator may wish to ensure that the end user is charged only if a service provided by the third party is successfully delivered, which again requires a level of control and/or monitoring by the network operator which is not currently available.

SUMMARY OF THE INVENTION

The present invention relates generally to a communications system having a traffic plane function (TPF) which for billing purposes filters service flows between end user equipments and application servers wherein the system correlates an instance of service flow filtered by the TPF with event results reported by an event owner for the instance service flow when events occur at an application server for that instance of service flow.

According to a first aspect of the present invention there is provided a communications system in which event based charging is implemented and in which service flows between end user equipments and application servers are filtered for charging purposes by a traffic plane function (TPF), wherein the TPF identifies an instance of service flow and sends a message to an event owner for the instance of service flow requesting notification of events associated with the instance of service flow, the event owner sends a reply message containing an event result when an event associated with the instance of service flow occurs which event result is correlated with the filtered instance of service flow.

According to a second aspect of the present invention there is provided a traffic plane function (TPF) for implementing event based charging in a communications system by filtering service flows between end user equipments and application servers wherein the TPF identifies an instance of service flow and sends a message to an event owner for the instance of service flow requesting notification of events associated with the filtered instance of service flow.

The TPF may receive the reply message from the event owner when an event occurs for the instance of service flow which reply message contains an event result and the TPF may correlate the event result with the filtered instance of service flow. Alternatively, an event correlator remote from the TPF, for example a billing system, may correlate the event result with the filtered instance of service flow in which case the message from the event owner may optionally be sent directly to the event correlator.

According to a third aspect of the present invention there is provided an event owner of an application server for which event based charging is implemented for service flows between end user equipments and the application server by a traffic plane function (TPF) filtering the service flows for charging purposes, wherein the event owner receives a message from such a TPF requesting notification of events associated with an instance of service flow and in response sends a message containing an event result when an event occurs.

According to a fourth aspect of the present invention there is provided a method for implementing event based charging in a communications system wherein service flows between end user equipments and application servers are filtered for charging purposes by a traffic plane function (TPF), the method comprising the steps of:
  the TPF identifying an instance of service flow between an end user equipment and an application server;
  the TPF sending a message to an event owner for the instance of service flow requesting notification of events associated with the instance of service flow;
  the event owner sending a reply message in response containing an event result when an event associated with the instance of service flow occurs;
wherein the method comprises the additional step of correlating the event result with the filtered instance of service flow.

The TPF may identify a service flow by matching characteristics of the service flow to filtering criteria. The instances of a service flow matching the filtering criteria, for example, may relate to a specific instance of a given end user equipment, may relate to a specific instance of end user application or may relate to a specific instance of end user application window that matched filtering criteria of the TPF. Identifying a given instance of service flow may require supplemental filtering criteria with a granularity beyond that of the filtering criteria used by the TPF to identify service flows. In this case a set of additional criteria (associated with the matched filtering criteria) which supplement the filtering criteria may be applied by the TPF so as to distinguish between different instances of service flow. This set may be an empty set, ie. the instance of service flow may identified by the same criteria as the service flow which matched the filtering criteria.

The present invention enables a correlation to be made between instances of service flows filtered by the TPF and one or more events reported by an event owner for those instances of service flow. For example, the correlation may be between events the TPF detects on a particular instance of service flow between an end user and an application server and the events reported by the event owner in the event results for that application server and instance of service flow. The event owner may send the reply message to the TPF, in which case the TPF may correlate events the TPF detects on the instances of service flow it filters with event reports. The TPF may then forward the correlated information to a billing system which applies appropriate rating so that an end user can be billed based on events which have occurred on service flows the end user has used.

Alternatively, information about the TPF detected events and event results can be forwarded to a billing system so that the billing system makes the correlation and then applies appropriate rating to bill the end user of the end user equipment appropriately, based on events which have occurred on service flows the end user has used.

Accordingly, event driven rating and event driven revenue sharing of traffic, for example based on time and data volume, can be provided. For example, for a gaming service, the present invention would enable the data volume and/or time charges an end user incurs in playing a game to be taken over by the gaming service provider when the end user wins a game, with the information about the game outcome not being known until after the game is completed by the end user. The present invention enables a billing system to apply a rating decision based on event results to charges for usage that has taken place prior to the event occurring on the application server and/or before the event owner reports the event.

In addition or alternatively, the correlation between TPF detected events and one or more events reported for that instance of service flow by the event owner can enable the network operator to check that events notified by the event owner to the TPF are in accordance with the results of the filtering of the instances of service flow by the TPF. Matching or correlating between the two event informations (ie. information from filtering by the TPF and event results) can be carried out in the TPF or may be outsourced to another entity, such as a billing system. Although there are types of events where such correlation is not achievable as the application event cannot be detected by the TPF (for example because the event is dependent on the state of the application server which is unknown to the TPF), the present invention allows for the correlation of a wide number of event types, providing the network operator with a granular charging control over a large range of applications among those typically operated by an event owner.

The identification of a service flow by the TPF may include the TPF matching characteristics of the service flow with triggering criteria so as to activate a trigger, which trigger may include a specification of triggering actions to be performed when the triggering criteria is met. The triggering criteria may comprise a set of service flow characteristics, such as, source IP address, destination IP address, upper layer protocol, source port, destination port and application protocol based criteria, for example types of application layer messages and the content of such messages.

For example, the triggering actions specified by a trigger may include at least one of the following:
  instructions to the TPF on how to filter a service flow matched to the triggering criteria;
  instructions to the TPF on how to identify the specific instance of service flow among those matched to the triggering criteria;
  instructions to the TPF on how to dynamically filter the specific instance of service flow;
  identification of the event owner for a service flow that matched the triggering criteria;
  identification of a set of service flow characteristics to be sent to the event owner for end user and session identification;
  indication of whether a time stamp should be recorded and communicated to the event owner;
  identification of a set of events to be reported by the event owner;
  maximum number of events to be reported for the instance of service flow;
  maximum number of events allowed for the instance of service flow before a new message to the event owner from the TPF is sent; and
  maximum number of events allowed for the instance of service flow.

It should also be noted that the TPF may send a request message to the event owner in relation to an instance of service flow it is filtering upon detecting an event occurring over the instance of service flow.

The event owner may be the application server of the service flow or may be a different server operated by the operator of the application server. The operator of the application server is generally a business organization providing content and applications.

The TPF may allocate a unique identifier to the instance of service flow and may include the unique identifier in the message to the event owner. Then the event owner may include the identifier with the event result in the reply message. This provides an efficient way of identifying instances of service flow, in particular when relaying event results and/or TPF detected results for instances of service flow to a billing system.

The TPF may include at least one of the following in the message to the event owner, in accordance with the triggering actions:
  the identifier;
  a set of flow characteristics for end user and session identification;
  information on the set of events to be reported by the event owner;
  a timestamp, as recorded by the TPF;
  a maximum number of events to be reported;
  a maximum number of events allowed for the instance of service flow before a new message to the event owner from the TPF is sent;
  a maximum number of events allowed for the instance of service flow.

The event result may contain information enabling the TPF to confirm by filtering of the instance of service flow that the event has taken place. For example, the event may be a data download over the instance of service flow and the event result may contain information about the size of the download. In this case the TPF can correlate that the amount of data specified in the event result corresponds to the amount of data detected, for example from information in header packets of the download, by the TPF for that instance of service flow. This can also enable the network operator to verify that the download is successful before allowing the end user to be charged for the download.

The unique identifier may be exchanged between the TPF and the billing system (which may be pre-paid or post-paid) so as to identify instances of service flow. This allows for the outsourcing to the billing system of the flow-event correlation and associated rating as well as of the event matching procedure where the TPF-detected events may be matched against the event results reported by the event owner.

In this way full correlation may be achieved between:
  the instance of service flow that has matched the triggering criteria in the TPF, possibly generating a TPF-detected event;
  the user charges related to that instance of service flow and related events in the billing system including charges relating to usage that took place before the event occurred or was reported; and
  the actions the end user takes on the application server run by the event owner.

The event may, for example, be one of the following:
  a purchase of goods or services from the application server;
  a download of data from the application server;
  access to a specific page on the application server;
  access to a particular videoclip streaming service on the application server;
  completion of a videoclip streaming from the application server; or
  a predetermined situation of usage of the application on the server, for example, the end user has reached a given score in a gaming application.

The TPF may include a gateway node interfacing an access network of the end user equipment with a further network via which the end user equipment communicates with the application server. For example, the access network may be a General Packet Radio Service (GPRS) network and the gateway may be a Gateway GPRS Support Node.

Other aspects and features of the present invention will become apparent to those ordinarily skilled in the art upon review of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

Figure 1:
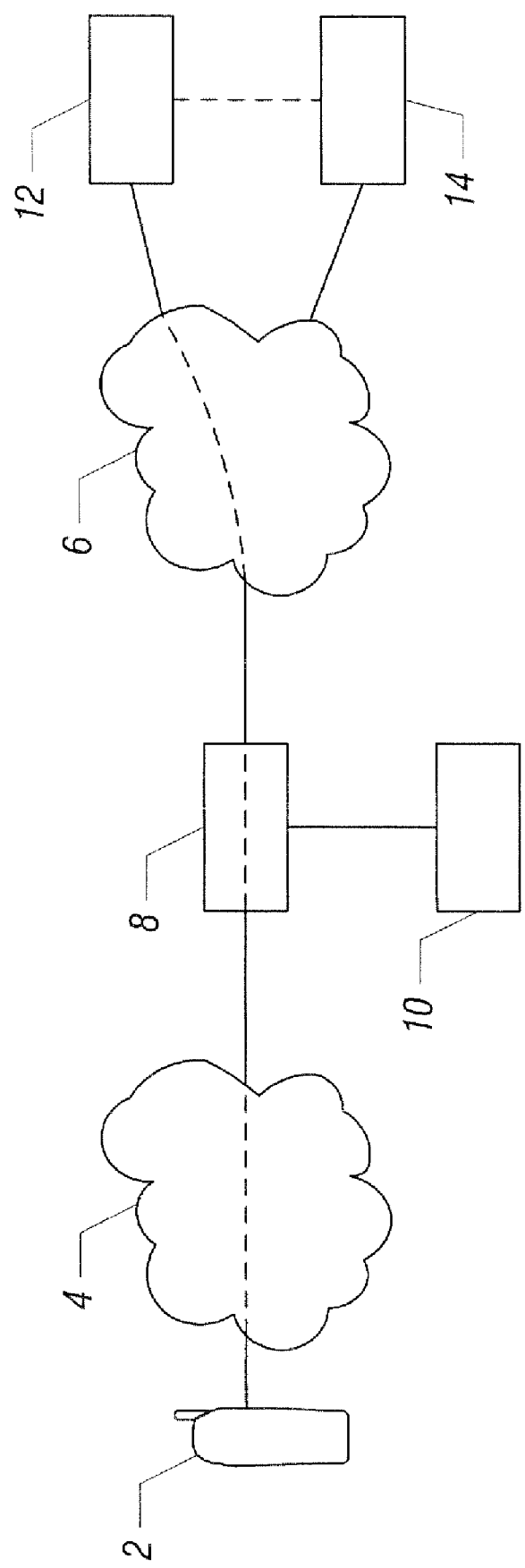
FIG. 1 shows schematically a network operating charging according to the present invention including an access network via which an end user accesses an IP network via which an end user accesses an application server, with the access network and the IP network interfaced by a gateway node of the access network.

With reference to FIG. 1, an end user having an end user equipment (2), such as a mobile or stationary telephone or computing device, may access an Internet Protocol (IP) network (6) via an access network (4). The access network (4) may be a packet switched network, such as a General Packet Radio Service (GPRS) network, which is interfaced with the IP network (6) via a gateway node or Gateway GPRS Support Node (GGSN) (8) of the GPRS Network. The IP network (6) may be a public or private intranet or internet, which may be made up of several interfaced networks.

The GGSN (8) transports data packets between the access network (4) and the IP network (6). The traffic plane function (TPF) (being a function of the GGSN (8) or a distinct physical entity associated with the GGSN), has the functionality to identify the separate packet streams or service flows the GGSN carries between each end user (2) and the IP network (6), to measure the stream duration and volume of data carried on each such service flow and to detect certain events occurring over service flows. The term gateway used as a general term herein includes a gateway such as a GGSN (8) and any associated entities in the traffic plane between the GGSN (8) and the IP network (6), involved in the method of charging according to the present invention.

The network includes at least one billing system (10). Where pre-paid online charging is applied, the billing system may be an OCS or an SCP for controlling online charging to end users.

The end user of the equipment (2) establishes a GPRS session by requesting a Primary Packet Data Protocol (PDP) context. The end user may then access services available on the IP network (6) via the GPRS network (4). The TPF (8) accesses the charging policies and/or rules for the end user of the equipment (2) and identifies any service flows that are initiated by the end user of the equipment (2) [box A in FIG. 3*a*].

The end user of the equipment (2) accesses an application server (12) via the access network (4) and the IP network (6). The application server (12) has an Internet Protocol (IP) address 111.222.233.244. The TPF (8) identifies and filters a first service flow (shown in dotted lines in FIG. 1) associated with the end user accessing the application server (12). The gateway (8) is set up by the network operator to associate a particular trigger with service flows to the application server (12) based on the service flow matching triggering criteria [box B in FIG. 3*a*]. The triggering criteria may be based on a number of the following:

the source (end user) IP address;
the destination (application server) IP address;
the upper layer protocol (UDP/TCP/other);
the source (end user) port;
the destination (application server) port (in most cases this represents the application protocol identification); and
application-level information such as:
the identification of a specific application layer message (eg. HTTP GET); and/or
the destination URL or any parameter relevant for the specific application and conveyed in the application protocol message parameters; and/or
the content of the payload of application layer messages (eg. the word 'won' in the payload of a message).

For example, a rule in the TPF (8) may take the form:

Dest=111.222.233.244 trigger 97

Thus, service flows to the application server (12) having IP address 111.222.223.224 are associated by the TPF (8) with the trigger no. 97. In this example the triggering criteria is the destination IP address.

A trigger may contain information, referred to herein as triggering actions. The triggering actions may, for example, instruct the TPF (8) how to filter service flows matched with the triggering criteria, instruct the gateway (8) that event based tariffing is to be applied to service flows matching that criteria, and may identify for the TPF (8) an event owner (14) associated with service flows matching that criteria.

The TPF (8) may be instructed by the triggering actions to apply dynamic filtering to service flows matching the triggering criteria. Dynamic filtering aims to select a given instance of service flows among all service flows that have matched the triggering criteria before and/or will match it in the future. Thus, dynamic filtering may be based on more restrictive criteria than the triggering criteria. For example, in the case of the rule set out above in which the triggering criteria is met by all service flows to the application server (12), the triggering actions may instruct the TPF (8) to set up one or more of the following dynamic filters depending on the desired granularity for the identification of the instance of service flow:

a) Dest=111.222.233.244; Source=<source IP address of the packet that matched the triggering criteria>;
b) Dest=111.222.233.244; Source=<source IP address of the packet than matched the triggering criteria>; Dest Port=<destination port of the packet that matched the triggering criteria>; and
c) Dest=111.222.233.244; Source=<source IP address of the packet than matched the triggering criteria>; Dest Port=<destination port of the packet that matched the triggering criteria>; Source port=<source port of the packet that matched the triggering criteria>.

The term dynamic stresses that the information, such as Source, and Source Port in the above example may not be available at system configuration time, and so it is dynamically added to the filtering policy for a service flow once the triggering criteria is matched by that service flow. Other information, such as Dest Port (destination port), though available at system configuration time, may be omitted by the triggering criteria, to make the triggering criteria more generic, and capture more flows with a single trigger that then dynamically specializes based on the characteristics of the flows that match the triggering criteria during system operation.

The exact set of dynamic filtering instructions which form part of the triggering actions and which supplement the triggering criteria so as to implement dynamic filtering is defined in the triggering actions, and it may be an empty set.

In addition to those discussed above, the triggering actions associated with a trigger may include at least one of the following:

1) An identification of a set of service flow characteristics to be sent to the event owner for end user and session identification. This information enables the event owner to identify the relevant session on the application server and the end user;
2) An indication of whether a time stamp should be recorded and communicated to the event owner;
3) An identification of the set of events to be reported by the event owner. If the triggering actions contain this instruction then, the message sent to the event owner by the TPF will specify exactly which event or events should be included in event results;
4) An identification of a maximum number of events to be reported by the event owner for the identified instance of service flow. If the triggering actions contain this instruction, then the message sent to the event owner by the TPF will specify this maximum;
5) An identification of a maximum number of events allowed for the identified instance of service flow before a new message to the event owner from the TPF is sent. Again, if the triggering actions contain this instruction, then the message sent to the event owner by the TPF will specify this maximum; and
6) An identification of a maximum number of events allowed for the identified instance of service flow. Again, if the triggering actions contain this instruction, then the message sent to the event owner by the TPF can specify this maximum.

Figure 3A:
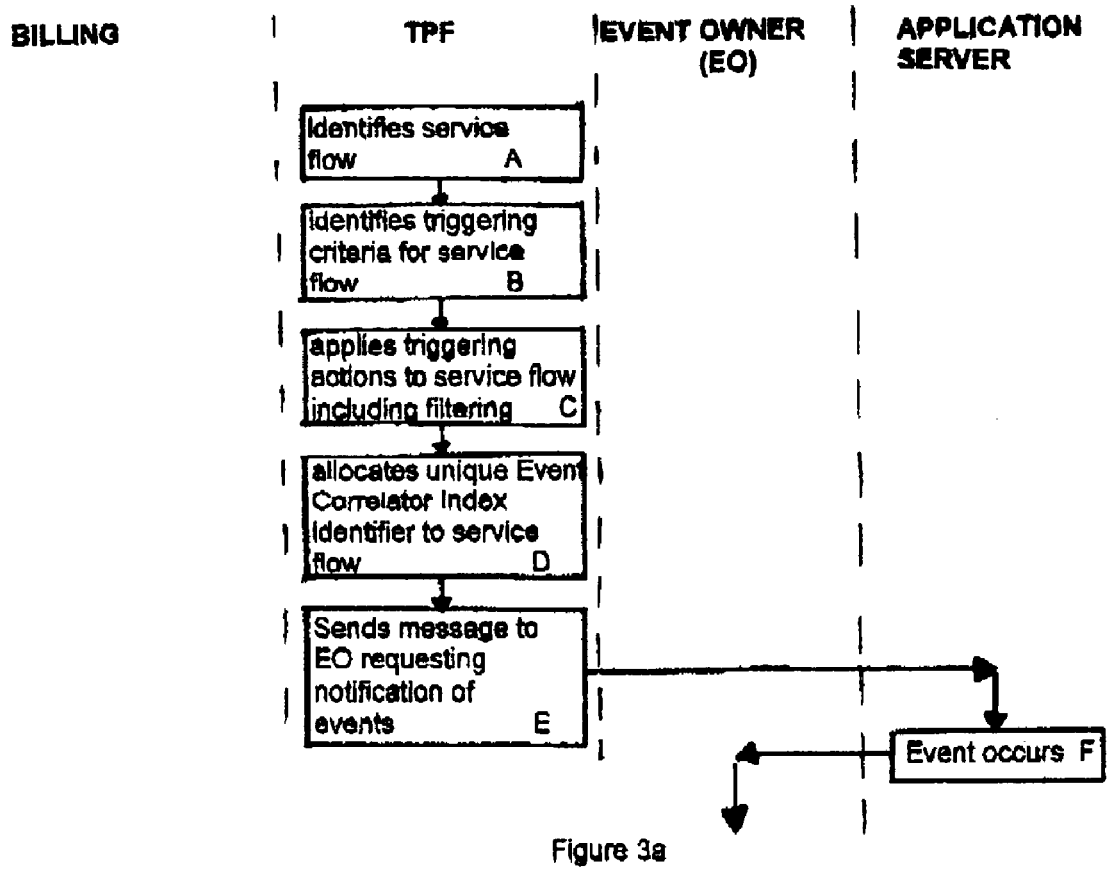
FIG. 3a shows schematically the actions carried out by and the interactions between a billing system, traffic plane function, event owner and application server shown in FIG. 1 according to one embodiment of the present invention.

The first service flow matches the triggering criteria of trigger no. 97 stored in the TPF (8) [box B in FIG. 3*a*]. This trigger no. 97 contains a set of triggering actions indicating that the tariffing of the first service flow is to be associated to an 'event' owned by an 'event owner'. The TPF (8) applies the triggering actions to the service flow [box C in FIG. 3*a*]. The TPF (8) analyses the triggering actions to identify the event owner, which in the case of triggering criteria no. 97 is the operator of the application server (12). The event owner may be identified by a unique code which is statically allocated to each business partner of the network operator. Each event owner is associated with an IP address of a front end server (14) which can provide the TPF (8) with information about application events related to the business partner. The TPF (8) implements a dynamic service flow filter in accordance with the triggering actions no. 97. In this example, the triggering criteria no. 97 instructs the gateway to filter the service flow on a 5-tuple basis. A dynamic filter applying 5-tuple, filters the service flow based on source IP address, destination IP address, protocol identification, destination port (ie, the port of the application server) and source port (ie. the port of the end user). This means that the instance of service flow is identified with a granularity down to a specific instance of end user application. For example, if the same end user had two browser windows open accessing the same page on the same application server, the dynamic filter would be able to distinguish between the two windows and to separately identify the flows related to the different windows.

For example, the end user may open two browser windows towards IP address 111.222.233.244, but may generate an application event, for example, winning a game, in only one of the two windows. The event owner, may want traffic for the window for which no event occurred to be treated in a different way to the traffic for the window in which the event occurred, for example to prevent fraud. This granularity is enabled by dynamic filtering based on the source port, where a different sub-filter and associated sub-bucket is applied to service flows to each source port of the end user. The dynamic service flow filter or sub-filters (where appropriate) have a related Bucket for counting the network resource (eg. stream duration, bytes, TPF-detected events) matching the service flow filter, or sub-filter. This is an example, where an event can be linked to a specific instance of service flow with a granularity that goes beyond the parameters that have made the service flow match the charging policy.

The gateway allocates an 'Event Correlator Index' to each new instance of service flow that matches the triggering criteria [box D in FIG. 3a]. This is a unique identifier which is dynamically allocated on a per event type per instance of service flow basis. This identifier identifies the instance of service flow defined by the dynamic filter, for example using the 5-tuple information set out above. The TPF (8) then sends a message [Box E in FIG. 3a] to the event owner containing, in this example:
  the set of service flow parameters for end user identification and application server session identification required by the event owner as specified in the triggering actions (eg. the address of the end user and other optional parameters among those in the above described 5-tuple and/or other application related criteria as described above);
  the Event Correlator Index that has been allocated to the instance of service flow;
  information on the set of events to be reported by the event owner as specified in the triggering actions, eg. report when the end user wins the game;
  a time stamp, as specified by the triggering actions; and
  the maximum number of events allowed for the instance of service flow, eg. one (in the case where the user cannot win more than once).
Then when the event of the specified type occurs [Box F in FIG. 3a] within the application server (12), the event owner (14) detects this and sends a message to the TPF (8) containing the Event Correlator Index and an 'event result' [Box G in FIG. 3b]. A single 'event result' may contain information about the occurrence of one or more events, depending of the instructions sent to the event owner by the TPF. The 'event result' is sent by the TPF (8) to the billing system (10) for the billing system to apply the appropriate rating to the first service flow [Box I in FIG. 3b]. The event result comprises code identifying the nature of the event or events, which code is recognized by the billing system, so that the billing system can apply the appropriate rating. The TPF (8) doesn't need to understand the event result, it only relays the event result to the relevant billing system.

Figure 2:
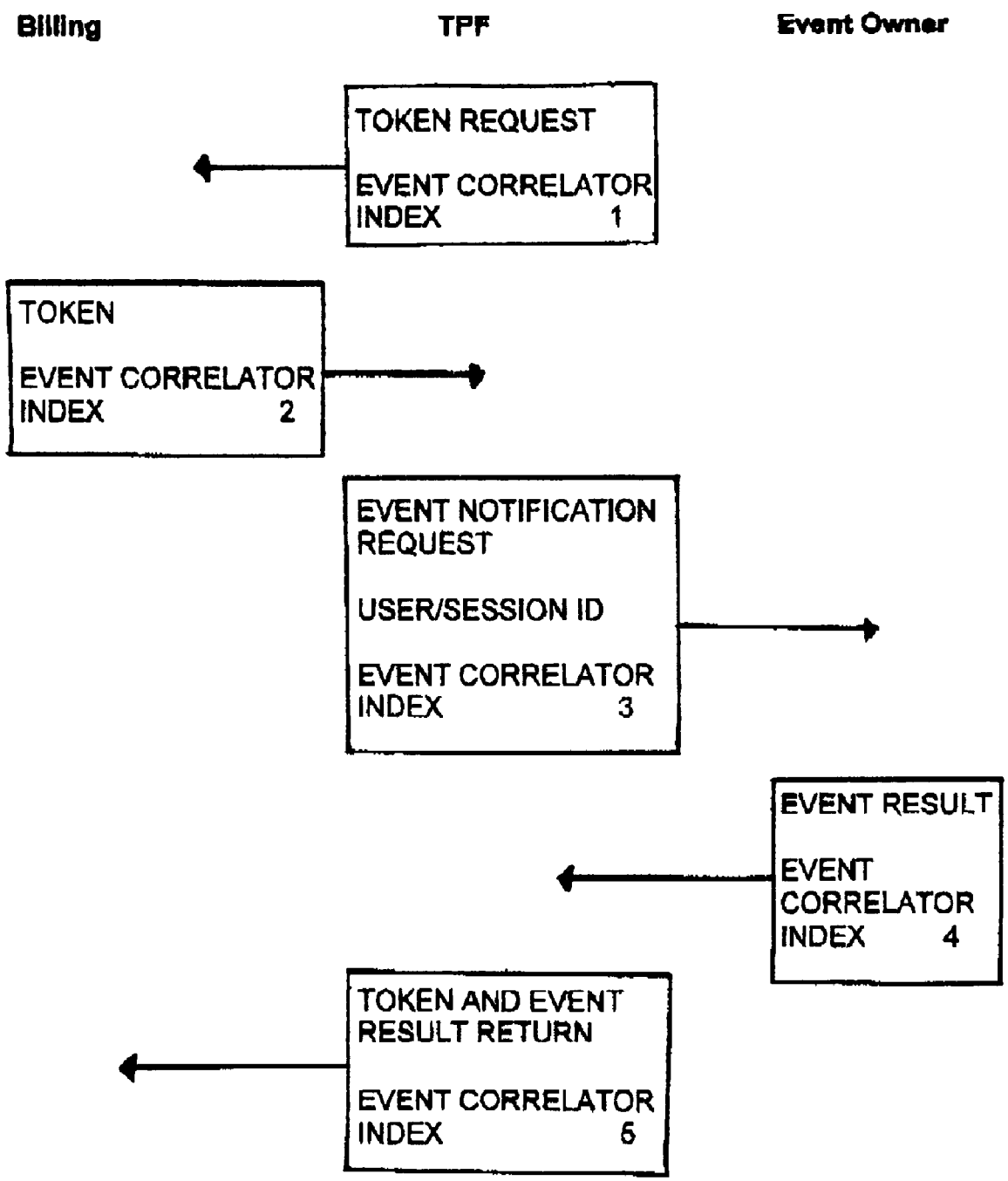
FIG. 2 shows schematically the exchange of messages between a billing system, traffic plane function and event owner shown in FIG. 1 in an example of pre-paid event based charging according to the present invention.

In the case of pre-paid charging, with reference to FIG. 2, the TPF (8) may notify the Event Correlator Index to the OCS or SCP (10) when making the first token request in respect of an instance of service flow [Box 1 in FIG. 2]. The OCS or SCP (10) sends the TPF a token [Box 2 in FIG. 2], which token also specifies the Event Correlator Index. The TPF includes the Event Correlator Index in the message requesting event notification it sends to the event owner (14) [Box 3 in FIG. 2]. Then after one or more of the events have occurred, the event owner (14) replies with an event result also containing the Event Correlator Index [Box 4 in FIG. 2]. The TPF (8) sends event results to the SCP/OCS (10) [Box 5 in FIG. 2]. The TPF (8) may jointly also return any partially unused tokens relating to the instance of service flow. The OCS or SCP (10) then applies the appropriate rating to the end user's account based on the returned token and the one or more events results, as described below. For example, the OCS or SCP (10) may amend, based on the event result, the rating of the entire instance of service flow, possibly issuing refunds related to previous charges issued for such flow, or additional charges.

Figure 3B:
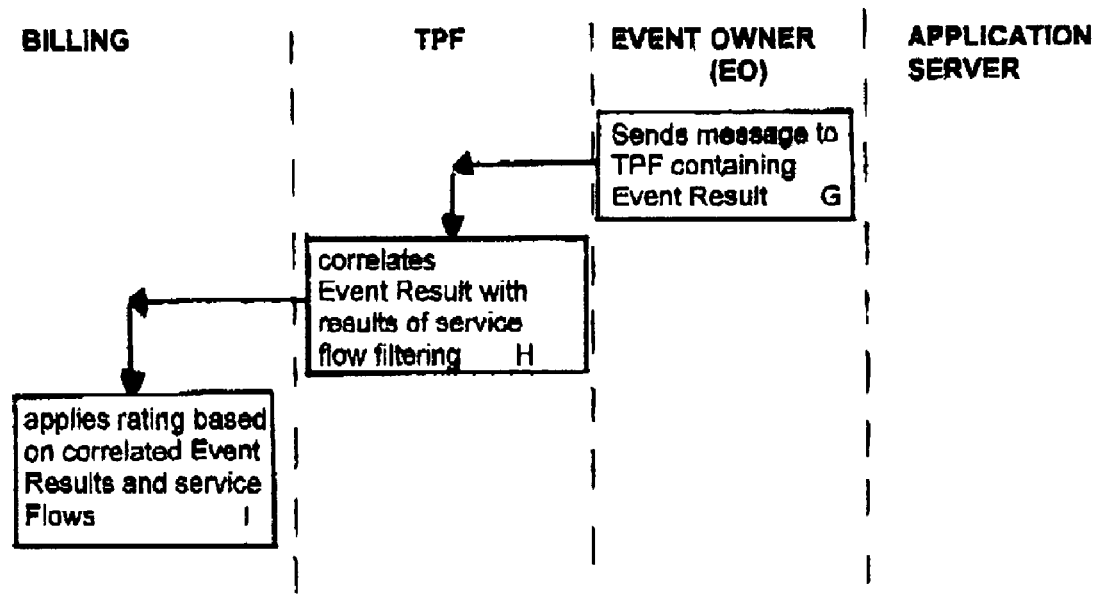
FIG. 3b shows schematically the actions carried out by and the interactions between a billing system, traffic plane function, event owner and application server shown in FIG. 1 subsequent to those of FIG. 3a according to one embodiment of the present invention.

In the case of post-paid charging, the TPF (8) may record the amount of network resource consumed by the instance of service flow (eg. counted bytes of data through filter, stream duration, detected events, etc.) and any 'event results' associated with that instance of service flow in its Charging Data Records (CDR), ie. its service flow usage log [Box H in FIG. 3b]. The CDR is periodically sent by the TPF to the billing system (10) so that the billing system can apply appropriate rating based on network resource consumed by the service flows and the events and charge the end user accordingly [Box I in FIG. 3b].

Figure 3C:
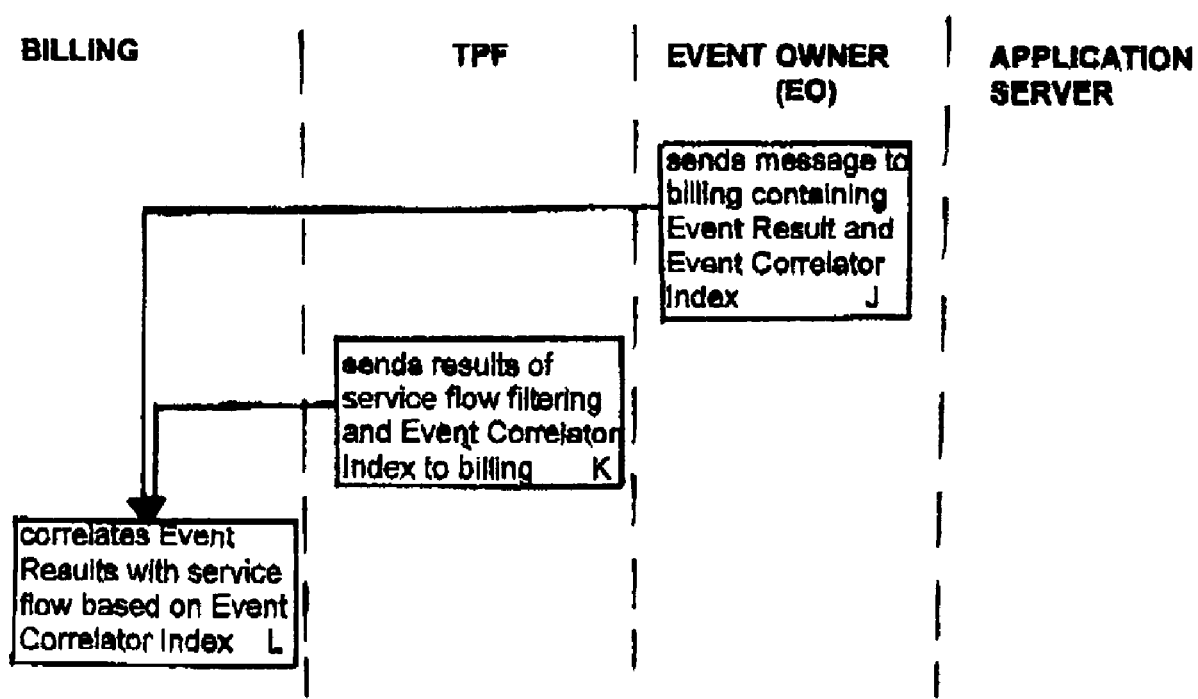
FIG. 3c shows schematically the actions carried out by and the interactions between a billing system, traffic plane function, event owner and application server shown in FIG. 1 subsequent to those of FIG. 3a according to another embodiment of the present invention.

In an alternative embodiment, the message sent by the TPF (8) to the event owner (14) may additionally contain the IP address of the billing system (10) and may instruct the event owner (14) to send the 'event result' along with the associated Event Correlator Index directly to the billing system (10) [Box J in FIG. 3c]. In this embodiment, the TPF (8) forwards information about the filtered service flows, such as stream duration, data flow and detected events to the billing system in association with the Event Correlator Index [Box K in FIG. 3b]. Then the billing system correlates the 'event results' with the information about the associated instance of service flow from the TPF (8) using the Event Correlator Index [Box L in FIG. 3c] and then applies the appropriate rating, as described below.

TABLE ONE

| EVENT | EVENT RESULT | BILLING SYSTEM | TPF |
|---|---|---|---|
| 1. Purchase of goods | Purchase completed | Apply discounted rate to instance of service flow | |
| 2. Purchase of goods | Purchase completed Cost Code | Charge end user according to cost code | |

TABLE ONE-continued

| EVENT | EVENT RESULT | BILLING SYSTEM | TPF |
|---|---|---|---|
| 3. Download of data | Download completed | Apply discounted rate to instance of service flow | |
| 4. Download of data | Download completed Cost Code | Charge end user according to cost code | |
| 5. Download of data | Download completed Size of download | | Compare size in Event Result to size of download detected for the instance of service flow |
| 6. Pre-determined Usage | Predetermined usage exceeded | Apply discounted rate to instance of service flow | |
| 7. Casino win or lose | Win/lose has occurred Value of win/lose | Credit/debit end user according to value of win/lose | |

Table 1 provides in the first column some examples of events and in the second column examples of the information which may be contained in their associated event results. Column three gives examples of what the billing system might do on receiving the event results (either directly from the event owner or indirectly via the TPF) of the associated row in column two and Column four gives an example of what the TPF might do on receiving the event result of the associated row in column two.

In examples 1 and 2 in Table 1, the application server (12) may be an E-commerce site and the event is the purchase of something from the site. Then by using the present invention discounts can be applied to the traffic charges for access to the site (12) if a purchase takes place (example 1). In this case, once the billing system (10) is notified that the event has occurred on an instance of service flow, it applies the appropriate discount to that instance of service flow. This could include the billing system retrospectively re-rating all of those charges which were incurred after the service flow met the triggering criteria in the TPF, but before the occurrence of the event in the application server. Additionally or, alternatively, by using the present invention, where the event result specifies a cost code (example 2), the billing system can recognise the cost of the purchase from the cost code and the purchase could be paid for from the end user's account with the network operator (in the case of pre-paid charging) or could be added to the billing to the end user by the network operator (in the case of post-paid charging).

In example 3 and 4, the application server (12) may be a site which offers downloads, and the event is a download of data, eg. software or music, from the site. Again by using the present invention appropriate discounts can be applied to the traffic charges if a download takes places (example 3) and/or the cost of the download can by paid for from the end user's account with the network operator or can be added to the end user's billing (example 4).

In examples 6 and 7, the application server (12) may be a casino site, and a first type of event is a level of Casino usage (example 6) and a second type of event is a win or lose result at the Casino (example 7). By using the present invention appropriate discounts can be applied to the traffic charges, for example, if a given level of usage of the casino service is exceeded, ie. the first type of event occurs (example 6). Also, bets can be paid for by the end user and wins can be credited to the end user via the end user's account with the network operator or via the network operator billing the end user when the second type of event occurs. In this case, the event result would specify the value of the credit or the debit and the billing system would apply this to the end user's account or billing.

Where an end user is charged on a per event basis to download large volumes of data, for example software, music or films, from an application server (12) and the network operator does not fully trust the associated event owner, the network operator may not wish to implement zero-rated charging for the downloads, on the basis that the event owner (14) reports downloads to the network operator and pays the network operator accordingly. However, by utilizing the present invention, a filter implemented by the TPF (8) can be configured to detect a download taking place [Box C in FIG. 3a]. The TPF (8) can then correlate the detected downloads associated with a given instance of service flow with the event results reported for that instance of service flow and report them to the network operator [Box H in FIG. 3b]. The network operator is then able to match downloads detected by the gateway for a given instance of service flow with event results reported for that instance of service flow. Alternatively, the TPF (8) could be set up to itself match downloads detected by the gateway for a given instance of service flow with event results reported for that instance of service flow. This provides a double check for the network operator that the event owner (14) is correctly notifying the TPF (8) when events take place on the application server for service flows carried by the TPF. For example, the network operator may require the event to include the size of a download on an instance of service flow in an event result (example 5 in Table 1) associated with that download over that instance of service flow, so that the TPF (8) can match the size of data downloads detected by the filter for that instance of service flow with the data downloads declared in the event result. In this way the network operator can ensure that all downloads are paid for. Also, the network operator can ensure that the end user is only charged for successful downloads, at least for those services where the usability of a file is compromised by an incomplete download.

The invention claimed is:

1. A communications system comprising a network subsystem, wherein the communications system is configured to implement event based charging, and the communications system is to filter service flows between end user equipments and application servers for charging purposes, wherein the network subsystem is configured to:
   identify an instance of service flow between an end user equipment and a particular application server,
   send a first message containing information identifying a set of events to report, and
   receive a second message containing an event result responsive to occurrence of an event of the particular application server that is one of the set of events and that is associated with the instance of service flow, which event result is correlated with the instance of service flow, the event result containing information about occurrence of the event.

2. A communications system according to claim 1 wherein the network subsystem comprises at least a traffic plane function (TPF) to perform the identifying, the sending, and the receiving, and wherein the TPF is configured to correlate the event result with the instance of service flow.

3. A communications system according to claim 2, further comprising a billing system, wherein the TPF is configured to provide notification of the event result and the instance of service flow to a billing system and the billing system is configured to implement at least one of debiting, crediting and discounting to the user of the end user equipment based on the event result.

4. A communications system according to claim 1 wherein to identify the instance of the service flow the network subsystem matches characteristics of the service flow to triggering criteria and applies associated triggering actions to the service flow.

5. A communications system according to claim 1 wherein to identify the instance of the service flow the network subsystem is configured to match characteristics of the service flow to triggering criteria and to apply associated triggering actions to the service flow, including at least one of the following:
- instructions on how to filter a service flow matched to the triggering criteria;
- instructions on how to identify the instance of service flow among those matched to the triggering criteria;
- instructions on how to dynamically filter the instance of service flow;
- identification of an event owner for the service flow that matched the triggering criteria;
- indication of whether a time stamp should be recorded;
- identification of a set of events to be reported by the event owner;
- maximum number of events to be reported for the instance of service flow; and
- maximum number of events allowed for the instance of service flow.

6. A communications system according to claim 1 in which the network subsystem is configured to allocate a unique identifier to the instance of service flow, and the communications system additionally includes a billing system configured to cooperate with the network subsystem to implement at least one of pre-paid and post-paid billing in which the billing system correlates the event result with the instance of service flow by using the unique identifier.

7. A communications system according to claim 1 additionally including a billing system, wherein the billing system, in response to the occurrence of the event, is configured to retrospectively amend charges incurred for the instance of service flow before that event occurred.

8. A communications system according to claim 1 wherein the network subsystem is configured to correlate the event result with the instance of service flow by matching the event result to the instance of service flow and notifying a billing system of the match.

9. A communications system according to claim 1 wherein the event result is correlated with the instance of service flow by matching the event result to an event detected by the network subsystem on the instance of service flow.

10. A communications system according to claim 1 wherein the occurred event is one of the following:
- a purchase of goods or services from the particular application server;
- a download of data from the particular application server;
- access to a specific page on the particular application server;
- access to a particular videoclip streaming service on the particular application server;
- completion of a videoclip streaming from the particular application server; or
- a predetermined situation of usage of an application on the particular application server.

11. The communications system of claim 10, wherein the predetermined situation of usage of the application in the particular application server comprises an end user reaching a given score in a gaming application.

12. A communications system according to claim 1 wherein the network subsystem includes a gateway GPRS support node (GGSN).

13. The communications system of claim 1, wherein the network subsystem is to further send a request to a network entity to request notification of information associated with the instance of service flow, the information to enable billing for the instance of service flow.

14. A communications system according to claim 13 wherein the network entity is a server operated by an operator of the application server.

15. A communications system according to claim 13 wherein the network subsystem is configured to allocate a unique identifier to the instance of service flow and to include the unique identifier in the request to the network entity.

16. A communications system according to claim 15 wherein the network entity includes the identifier with the event result in the message received by the network subsystem.

17. A communications system according to claim 13 wherein the network subsystem is configured to include at least one of the following in the request to the network entity:
- a unique identifier allocated for the instance of service flow;
- a set of flow characteristics for end user and session identification;
- a timestamp;
- a maximum number of events to be reported;
- a maximum number of events allowed for the instance of service flow; and
- an address of a device to which event results are to be sent.

18. A communications system according to claim 13 additionally including a billing system, wherein the network subsystem is configured to allocate a unique identifier to the instance of service flow and to notify the unique identifier to the network entity, wherein the unique identifier is included by the network entity in the event result and the second message is sent to the billing system, and the network subsystem is configured to send results of filtering of the instance of service flow to the billing system identifying the instance of service flow by the unique identifier, and wherein the billing system is configured to correlate the filtering results and the event result based on the unique identifier.

19. A network subsystem for implementing event based charging in a communications system by filtering service flows between end user equipments and application servers, the network subsystem having a computer-readable storage medium encoded with software that when executed cause the network subsystem to:
- identify an instance of service flow between an end user equipment and a particular application server;
- send a first message containing information identifying a set of events to report, and
- receive a second message responsive to occurrence of an event that is one of the set of events at the particular application server for the instance of service flow, the second message containing an event result that is correlated with the instance of service flow, and the event result containing information about occurrence of the event.

20. A network subsystem according to claim 19 wherein the first message is to be sent to an event owner for the instance of service flow and further requests information associated with the instance of service flow to enable billing for the instance of service flow.

21. A network subsystem according to claim 20 which includes at least one of the following in the first message to the event owner:
- a unique identifier allocated by the network subsystem for the instance of service flow;
- a set of flow characteristics for end user and session identification;
- a timestamp, as recorded by the network subsystem;
- a maximum number of events to be reported;
- a maximum number of events allowed for the instance of service flow; and
- an address of a device to which the event owner should send event reports, if different from the network subsystem.

22. A network subsystem according to claim 20 which is configured to allocate a unique identifier to the instance of service flow and to include the identifier in the first message to the event owner.

23. A network subsystem according to claim 19 wherein to identify the instance of the service flow the network subsystem is configured to match characteristics of the service flow to triggering criteria and to apply associated triggering actions to the service flow.

24. A network subsystem according to claim 19 wherein to identify the instance of the service flow the network subsystem is configured to match characteristics of the service flow to triggering criteria and to apply associated triggering actions to the service flow, including at least one of the following:
- instructions on how to filter the service flow matched to the triggering criteria;
- instructions on how to identify the instance of service flow among those matched to the triggering criteria;
- instructions on how to dynamically filter the instance of service flow;
- identification of an event owner for the service flow that matched the triggering criteria;
- identification of a set of service flow characteristics to be sent to the event owner for end user and session identification;
- indication of whether a time stamp should be recorded;
- identification of a set of events to be reported by the event owner;
- maximum number of events to be reported for the instance of service flow; and
- maximum number of events allowed for the instance of service flow.

25. A network subsystem according to claim 19, wherein the software when executed causes the network subsystem to correlate the event result with the instance of service flow by matching the event result to the instance of service flow and notifying a billing system of the match.

26. A network subsystem according to claim 19, wherein the software when executed causes the network subsystem to correlate the event result with the instance of service flow by matching the event result to an event detected by the network subsystem on the instance of service flow.

27. A network subsystem according to claim 19 which includes a gateway GPRS support node.

28. The network subsystem of claim 19, wherein the network subsystem comprises at least one traffic plane function.

29. A computer server associated with an event owner of an application server for which event based charging is implemented for service flows between end user equipments and the application server by a network subsystem filtering the service flows for charging purposes, wherein the computer server associated with the event owner is configured to:
- receive a first message from the network subsystem requesting notification of a set of events associated with an instance of service flow, and
- in response to occurrence of an event that is one of the set of events at the application server, send a message to the network subsystem containing an event result containing information about the occurrence of the event.

30. A computer server associated with the event owner according to claim 29 wherein the occurred event is one of the following:
- a purchase of goods or services from the application server;
- a download of data from the application server;
- access to a specific page on the application server;
- access to a particular videoclip streaming service on the application server;
- completion of a videoclip streaming from the application server; or
- a predetermined situation of usage of an application on the application server.

31. A computer server associated with the event owner according to claim 29 wherein the first message received from the network subsystem further contains at least one of the following:
- a unique identifier of the instance of service flow allocated by the network subsystem;
- a set of flow characteristics for end user and session identification;
- a timestamp, as recorded by the network subsystem;
- a maximum number of events to be reported;
- a maximum number of events allowed for the instance of service flow; and
- an address of the device to which the event owner should send event results.

32. A method of event based charging in a communications system wherein service flows between end user equipments and application servers are filtered for charging purposes, the method comprising:
- a network subsystem identifying an instance of service flow between an end user equipment and a particular application server;
- the network subsystem sending a first message containing information identifying a set of events to report;
- the network subsystem receiving a second message containing an event result responsive to occurrence of an event of the particular application server that is one of the set of events and that is associated with the instance of service flow, wherein the event result contains information regarding occurrence of the event.

33. A method according to claim 32 wherein the network subsystem identifying the instance of the service flow includes the network subsystem matching characteristics of the service flow to triggering criteria and applying associated triggering actions to the service flow.

34. A method according to claim 32 wherein the network subsystem identifying the instance of service flow includes the network subsystem matching characteristics of the service flow to triggering criteria and applying the associated triggering actions to the service flow, including at least one of the following:
- instructions on how to filter the service flow matched to the triggering criteria;
- instructions on how to identify the instance of service flow among those matched to the triggering criteria;
- instructions on how to dynamically filter the instance of service flow.

35. A method according to claim 32 wherein an event owner performs generating the event result which contains information enabling an operator of the communications system to confirm by filtering of the instance of service flow that the event has taken place.

36. A method according to claim 32, further comprising the network subsystem correlating the event result with the instance of service flow by matching the event result to the instance of service flow and notifying a billing system of the match.

37. A method according to claim 32, further comprising correlating the event result with the instance of service flow by matching the event result to an event detected by the network subsystem on the instance of service flow.

38. A method according to claim 32 wherein the occurred event is one of the following:

a purchase of goods or services from the particular application server;

a download of data from the particular application server;

access to a specific page on the particular application server;

access to a particular videoclip streaming service on the particular application server;

completion of a videoclip streaming from the particular application server; or a predetermined situation of usage of an application on the particular application server.

39. The method of claim 32, further comprising:

the network subsystem sending a request to a network entity to request notification of information associated with the instance of service flow.

* * * * *